(12) United States Patent
Nelson et al.

(10) Patent No.: US 7,866,084 B1
(45) Date of Patent: Jan. 11, 2011

(54) FISHING JIG WITH EASY TIE EYE

(76) Inventors: Joshua Roy Nelson, 2651 Fairlawn Dr., Stillwater, MN (US) 55082; Bruce Carl Nelson, 2651 Fairlawn Dr., Stillwater, MN (US) 55082; Chad Carl Nelson, 12768-170th St. No., Marine on the St. Croix, MN (US) 55047

( * ) Notice: Subject to any disclaimer, the term of this patent is extended or adjusted under 35 U.S.C. 154(b) by 237 days.

(21) Appl. No.: 12/231,037

(22) Filed: Aug. 29, 2008

(51) Int. Cl.
*A01K 85/00* (2006.01)

(52) U.S. Cl. ...................... 43/42.39; 43/42.36; 43/42.49

(58) Field of Classification Search ................ 43/42.39, 43/42.36, 42.49, 43.16, 44.83
See application file for complete search history.

(56) References Cited

U.S. PATENT DOCUMENTS

| | | | | |
|---|---|---|---|---|
| 1,250,913 A * | 12/1917 | McCormic | ................. | 43/42.39 |
| 2,202,519 A * | 5/1940 | Ferris | ........................ | 43/42.36 |
| 2,295,292 A * | 9/1942 | Rogers | ...................... | 43/42.36 |
| 2,305,865 A * | 12/1942 | Goyings | .................... | 43/42.36 |
| 2,589,007 A * | 3/1952 | Landon | ..................... | 43/42.39 |
| 2,593,792 A * | 4/1952 | Reckler | .................... | 43/42.36 |
| 2,663,965 A * | 12/1953 | Rosen | ....................... | 43/42.39 |
| 2,682,126 A * | 6/1954 | Shepherd | ......................... | 43/4 |
| 2,770,908 A * | 11/1956 | Hessert, Jr. | ................ | 43/44.83 |
| 2,847,791 A * | 8/1958 | Simmons | ................... | 43/42.39 |
| 2,878,611 A * | 3/1959 | Netherton et al. | .......... | 43/42.39 |
| 2,878,612 A * | 3/1959 | Netherton et al. | .......... | 43/42.39 |
| 3,006,104 A * | 10/1961 | Allen | ........................ | 43/42.39 |
| 3,091,885 A * | 6/1963 | Ulsh | ......................... | 43/44.83 |
| 3,120,074 A * | 2/1964 | Messler | .................... | 43/42.39 |
| 3,344,549 A * | 10/1967 | Peters et al. | .............. | 43/42.39 |
| 3,357,086 A * | 12/1967 | Hood | .............................. | 43/4 |
| 3,410,020 A * | 11/1968 | McClellan et al. | ......... | 43/42.39 |
| 3,497,987 A * | 3/1970 | Perrin | ....................... | 43/42.39 |
| 3,750,321 A * | 8/1973 | McClellan | ................. | 43/42.39 |
| 3,750,323 A * | 8/1973 | Weis | ......................... | 43/42.39 |
| 3,898,760 A * | 8/1975 | Klein | ........................ | 43/44.83 |
| 3,909,974 A * | 10/1975 | Kent | ......................... | 43/42.39 |
| 3,973,350 A * | 8/1976 | England | .................... | 43/42.39 |
| 4,045,903 A * | 9/1977 | Parker | ....................... | 43/42.39 |
| 4,712,326 A * | 12/1987 | Hoover et al. | .............. | 43/42.39 |
| 4,713,907 A * | 12/1987 | Dudeck | ..................... | 43/42.39 |
| 4,738,047 A * | 4/1988 | Ryan | ......................... | 43/42.39 |
| 4,819,366 A * | 4/1989 | Manno | ....................... | 43/42.39 |
| 4,879,835 A * | 11/1989 | Sprayberry | ................ | 43/42.39 |
| 4,930,249 A * | 6/1990 | Johns | ........................ | 43/43.16 |
| 4,942,689 A * | 7/1990 | Link et al. | ................. | 43/42.36 |
| 5,040,325 A * | 8/1991 | Herrmann | .................. | 43/42.36 |
| 5,119,581 A * | 6/1992 | Rudolph | .................... | 43/42.39 |
| 5,231,786 A * | 8/1993 | Hughes | ..................... | 43/42.39 |
| 5,491,927 A * | 2/1996 | Ortiz | ......................... | 43/42.39 |

(Continued)

FOREIGN PATENT DOCUMENTS

DE          10310803 A1 *  9/2004

(Continued)

*Primary Examiner*—Darren W Ark
(74) *Attorney, Agent, or Firm*—Thomas B. Tate

(57) ABSTRACT

A fishing jig with a hook that has an oversized eye and a jig head that has a funnel-shaped lead-in area. The oversized eye makes it easy to insert the fishing line into the eye. The funnel-shaped lead-in area is used to guide the line directly into the eye of the hook.

1 Claim, 1 Drawing Sheet

U.S. PATENT DOCUMENTS

| | | | | |
|---|---|---|---|---|
| 5,537,775 | A * | 7/1996 | Crumrine | 43/42.39 |
| 5,551,185 | A * | 9/1996 | Reed | 43/42.39 |
| 5,638,633 | A * | 6/1997 | Hoffman, Jr. | 43/44.83 |
| 5,806,234 | A * | 9/1998 | Nichols | 43/42.39 |
| 5,899,015 | A * | 5/1999 | Link | 43/42.39 |
| 5,956,890 | A * | 9/1999 | Hoffman, Jr. | 43/44.83 |
| 5,970,650 | A * | 10/1999 | Mammel | 43/44.83 |
| 6,041,541 | A * | 3/2000 | Davis | 43/44.83 |
| 6,519,895 | B1 * | 2/2003 | Bennett | 43/42.39 |
| 6,625,921 | B2 * | 9/2003 | Friederichs, III | 43/44.83 |
| 6,760,997 | B1 * | 7/2004 | Mammel | 43/44.83 |
| 6,772,553 | B2 * | 8/2004 | Phillips et al. | 43/42.39 |
| 6,898,894 | B1 * | 5/2005 | Anderson | 43/42.39 |
| 7,140,146 | B2 * | 11/2006 | Gill | 43/42.39 |
| 7,421,820 | B2 * | 9/2008 | Harrell | 43/42.39 |
| 7,424,786 | B1 * | 9/2008 | Nelson et al. | 43/42.39 |
| 7,614,178 | B2 * | 11/2009 | Hoyt | 43/42.39 |
| 7,743,550 | B2 * | 6/2010 | Huddleston | 43/42.39 |
| 2001/0045048 | A1 * | 11/2001 | Johnson | 43/42.39 |
| 2004/0107628 | A1 * | 6/2004 | Mueller | 43/42.39 |
| 2004/0154212 | A1 * | 8/2004 | Harrell | 43/42.39 |
| 2005/0183323 | A1 * | 8/2005 | Harrell | 43/42.39 |
| 2005/0217165 | A1 * | 10/2005 | Anderson | 43/42.39 |
| 2006/0213111 | A1 * | 9/2006 | Mitchell | 43/42.39 |
| 2007/0119092 | A1 * | 5/2007 | Gruber | 43/44.83 |
| 2007/0271838 | A1 * | 11/2007 | Lowiecki | 43/42.39 |
| 2008/0202018 | A1 * | 8/2008 | Gill | 43/42.39 |
| 2008/0236022 | A1 * | 10/2008 | Harrell | 43/42.39 |
| 2008/0250693 | A1 * | 10/2008 | Krueger | 43/42.39 |
| 2009/0044441 | A1 * | 2/2009 | Neal et al. | 43/44.83 |
| 2009/0077859 | A1 * | 3/2009 | Aylsworth | 43/42.39 |
| 2009/0090040 | A1 * | 4/2009 | Kite et al. | 43/42.39 |
| 2009/0211144 | A1 * | 8/2009 | Murphy | 43/42.39 |
| 2009/0265975 | A1 * | 10/2009 | Gibson | 43/42.39 |
| 2010/0050497 | A1 * | 3/2010 | Brown | 43/42.36 |
| 2010/0101138 | A1 * | 4/2010 | Perrick | 43/42.39 |

FOREIGN PATENT DOCUMENTS

| | | | |
|---|---|---|---|
| FR | 2587172 | A1 * | 3/1987 |
| FR | 2628293 | A1 * | 9/1989 |
| JP | 09308411 | A * | 12/1997 |
| JP | 10066479 | A * | 3/1998 |
| JP | 10136836 | A * | 5/1998 |
| JP | 10229785 | A * | 9/1998 |
| JP | 2000139275 | A * | 5/2000 |
| JP | 2000201574 | A * | 7/2000 |
| JP | 2000324980 | A * | 11/2000 |
| JP | 2001000078 | A * | 1/2001 |
| JP | 2002112669 | A * | 4/2002 |
| JP | 2002125523 | A * | 5/2002 |
| JP | 2002153167 | A * | 5/2002 |
| JP | 2003116412 | A * | 4/2003 |
| JP | 2003319737 | A * | 11/2003 |
| JP | 2004135511 | A * | 5/2004 |
| JP | 2008167754 | A * | 7/2008 |
| JP | 2009072109 | A * | 4/2009 |
| JP | 2009125069 | A * | 6/2009 |
| JP | 2009142245 | A * | 7/2009 |
| WO | WO 2005029953 | A1 * | 4/2005 |

* cited by examiner

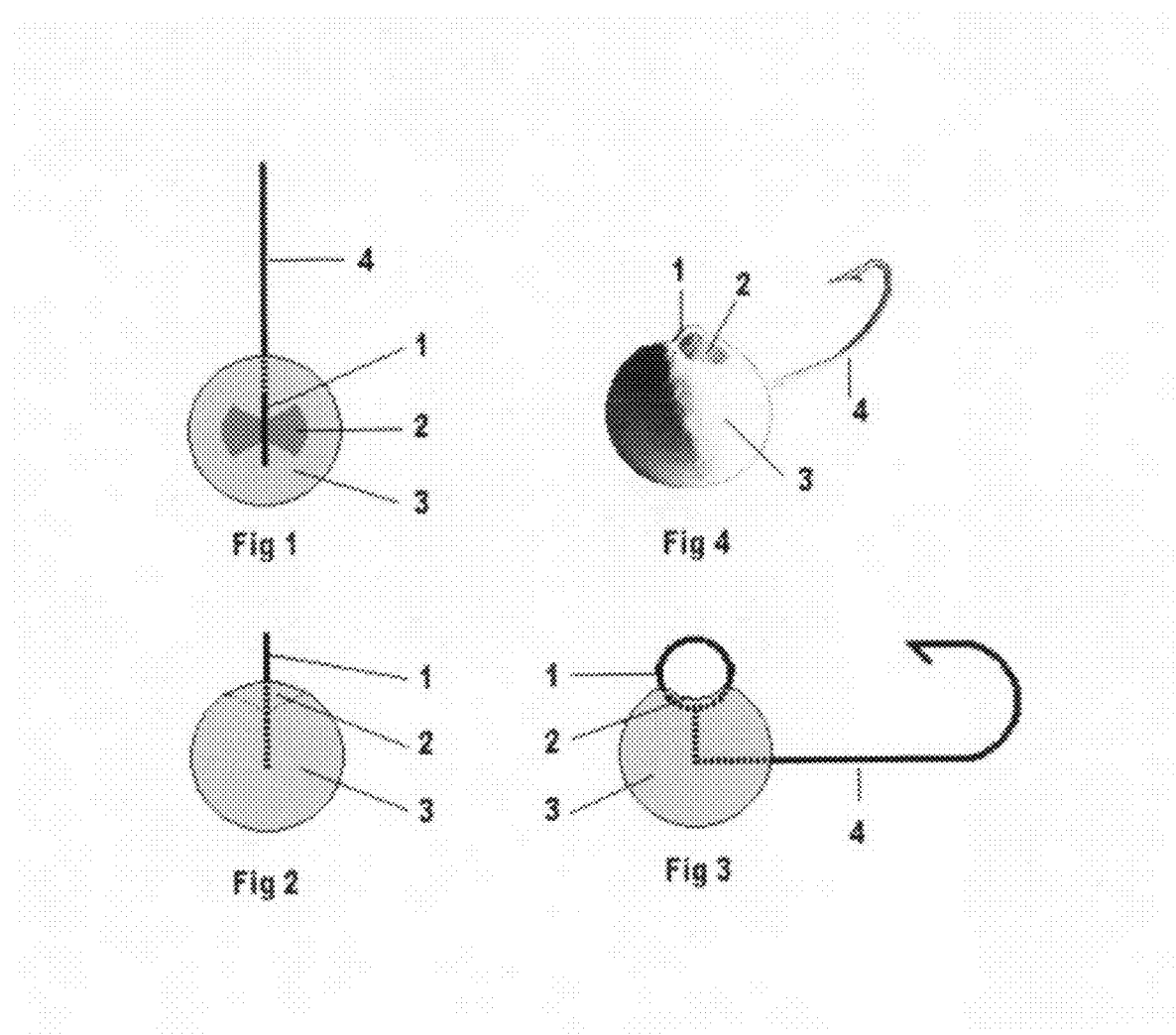

FISHING JIG WITH EASY TIE EYE

BACKGROUND OF THE INVENTION

The field of the invention is fishing jigs, particularly fishing jigs having a large eye and a funnel-shaped lead-in area.

Fishing jigs commonly have a hook with an eye through which the fishing line is threaded and tied. The eye is small, the inside diameter of the eye typically being about one hundred twenty-four percent or less of the diameter of the wire that forms the hook. Because modern types of fishing line are flexible and braided, many fishermen have difficulty threading the line into the eye, especially in low light or when there is motion. In particular, fishermen who are far-sighted, as many middle-aged and older people are, often cannot see the eye well enough to thread the line through it unless they are wearing glasses. If the eye is painted, the problem is compounded because the eye is further narrowed by the paint.

The largest known eye in the prior art has an inside diameter of one hundred ninety-four percent of the diameter of the wire that forms its hook (which is a straight hook, not a jig hook). No lead-in funnels are used on any jigs known in the prior art.

SUMMARY OF THE INVENTION

The invention is a fishing jig that has a hook with an oversized eye and has a funnel-shaped lead-in area surrounding the eye that guides the fishing line directly into the eye. An advantage of the invention is that a fisherman can thread the fishing line into the eye much more easily than is possible with prior art jigs.

DESCRIPTION OF THE DRAWINGS

FIG. 1 is a top view.
FIG. 2 is a front view.
FIG. 3 is a right side view.
FIG. 4 is a three dimensional (isometric) view.

DETAILED DESCRIPTION OF THE INVENTION

The invention is a fishing jig with an easy tie eye. The jig comprises a custom jig hook 4 that has an oversized eye 1 and a custom molded jig head or main body 3 that has a funnel-shaped lead-in area 2 that facilitates insertion of the fishing line (conventional; not shown) into the eye 1 of the hook 4.

The hook 4 projects from the main body 3, generally perpendicularly to the vertical axis of the main body 3, as best seen in FIG. 3. The barbed end of hook 4 is distal to the main body 3. The end of the hook 4 that is inside the main body 3 forms a generally L-shaped right angle.

The eye 1 is formed at the vertical end of the hook 4 that is inside the main body 3. The eye 1 is generally circular in shape. The bottom part of the eye 1 is recessed into the top of the main body 3, as best seen in FIGS. 3 and 4. The eye 1 has an inside diameter that is at least two hundred percent of the diameter of the wire used to construct the hook 4. Preferably the inside diameter of the eye 1 is between two hundred and three hundred percent of the diameter of wire of the hook 4, but it may be even larger. The large inside diameter of the eye 1 makes it easier for a fisherman to see the opening and thread the fishing line through the eye 1.

The lead-in area 2 is shaped like a funnel, as best seen in FIGS. 2 and 4. The funnel-shaped lead-in area 2 is formed into the main body 3 as a concave depression surrounding the recessed portion of the eye 1 and tapering toward the eye 1 from opposing sides of the eye 1, as best seen in FIG. 1. The purpose of the funnel-shaped lead-in area 2 is to guide the fishing line directly into the eye 1 of the hook 4, following the contour of the funnel 2.

We claim:
1. A fishing jig with an easy tie eye, said jig comprising:
a main body having a vertical axis and an outer surface;
a hook projecting from said main body generally perpendicularly to said vertical axis of said main body, said hook being constructed of wire having a diameter, said hook having a barbed end that is distal to said main body, said hook having an intermediate portion that forms a generally L-shaped right angle inside said main body, said generally L-shaped right angle comprising a horizontal part and a vertical part that projects upwardly from said horizontal part;
an oversized eye formed at another end of said hook opposing said barbed end, said another end of said hook being said vertical part of said generally L-shaped right angle, said eye having a generally circular shape, said generally circular shape being a closed circle having a top part and a bottom part, said eye having an inside diameter that is at least two hundred percent of said diameter of said wire used to construct said hook, said eye being partially recessed into said main body to form a partially recessed portion of said eye, said partially recessed portion being said bottom part of said eye, wherein a majority of said inside diameter of said eye extends above an uppermost portion of said outer surface of said main body; and
a funnel formed into said main body, said funnel having a contour that is a concave depression surrounding said partially recessed portion of said eye and tapering toward said eye from opposing sides of said eye, said funnel serving as a lead-in area to guide fishing line into said eye following said contour of said funnel.

\* \* \* \* \*